April 24, 1956     E. L. ALLGAIER     2,742,714
DRIVER TRAINING EQUIPMENT
Filed Feb. 28, 1952     3 Sheets-Sheet 1
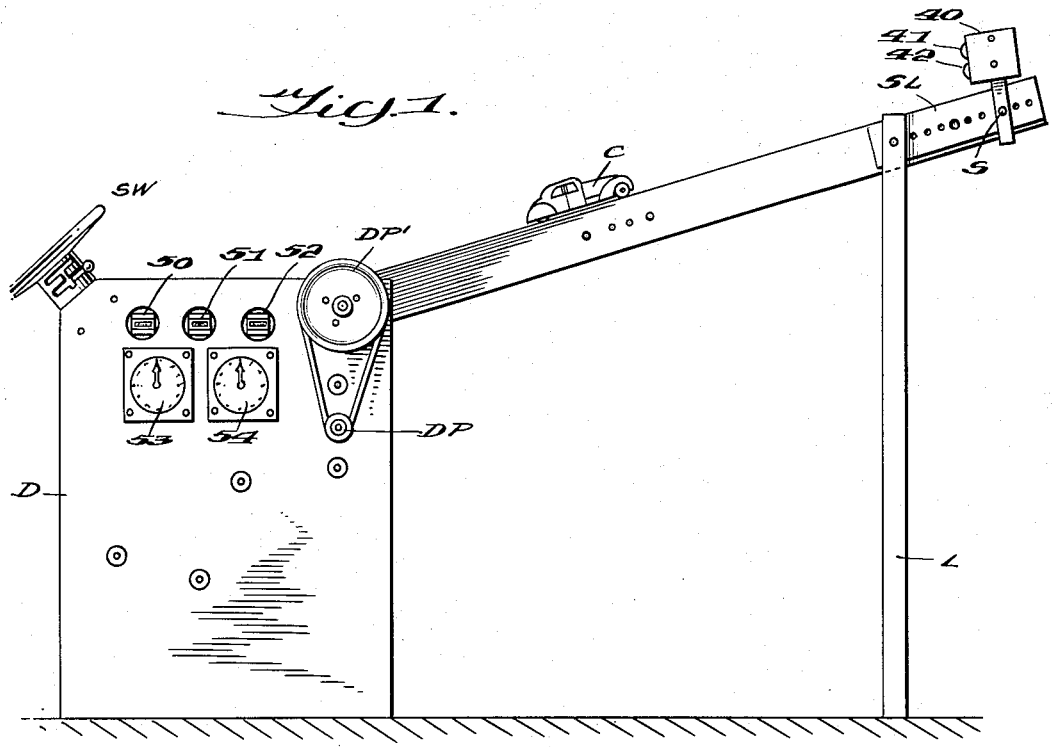
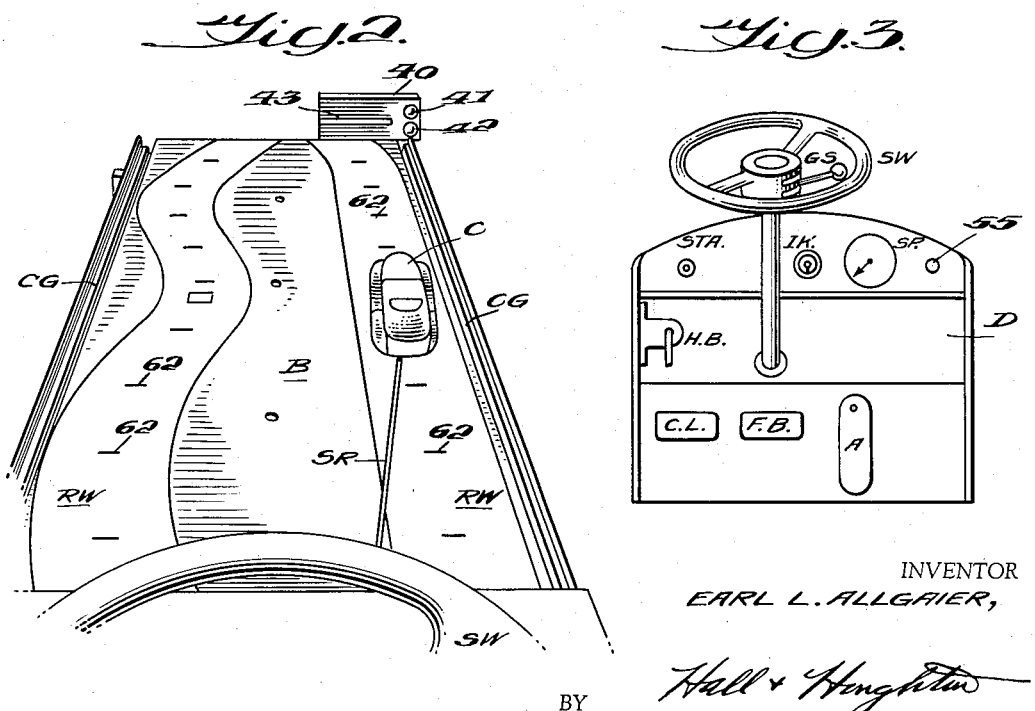
INVENTOR
EARL L. ALLGAIER,
BY
ATTORNEYS April 24, 1956     E. L. ALLGAIER     2,742,714
DRIVER TRAINING EQUIPMENT
Filed Feb. 28, 1952     3 Sheets-Sheet 2
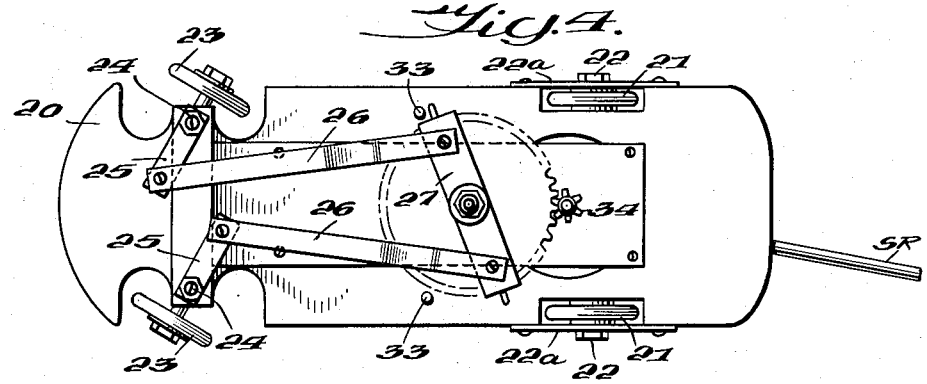
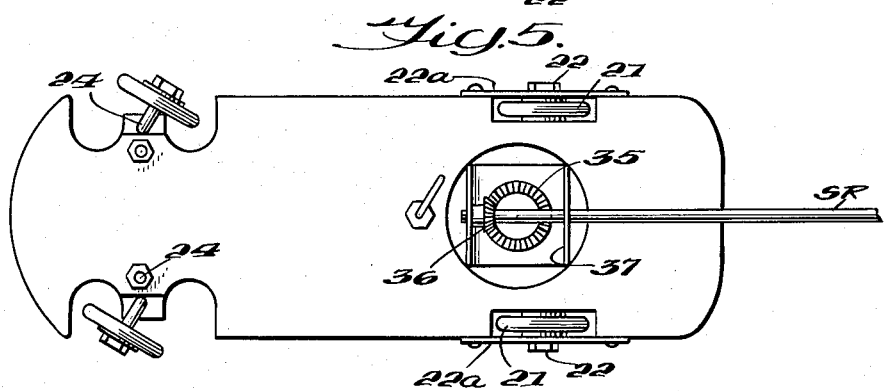
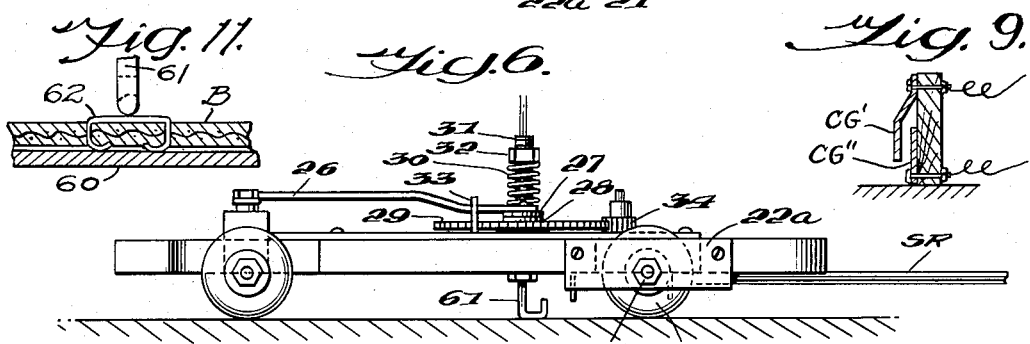
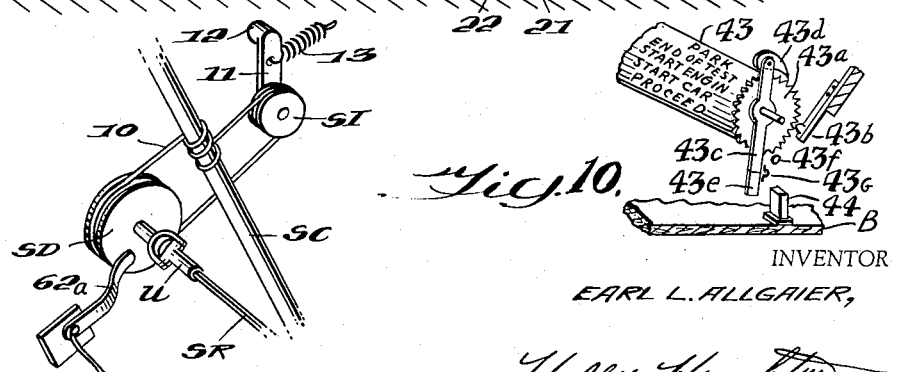
INVENTOR
EARL L. ALLGAIER,
BY Hall + Houghton
ATTORNEYS

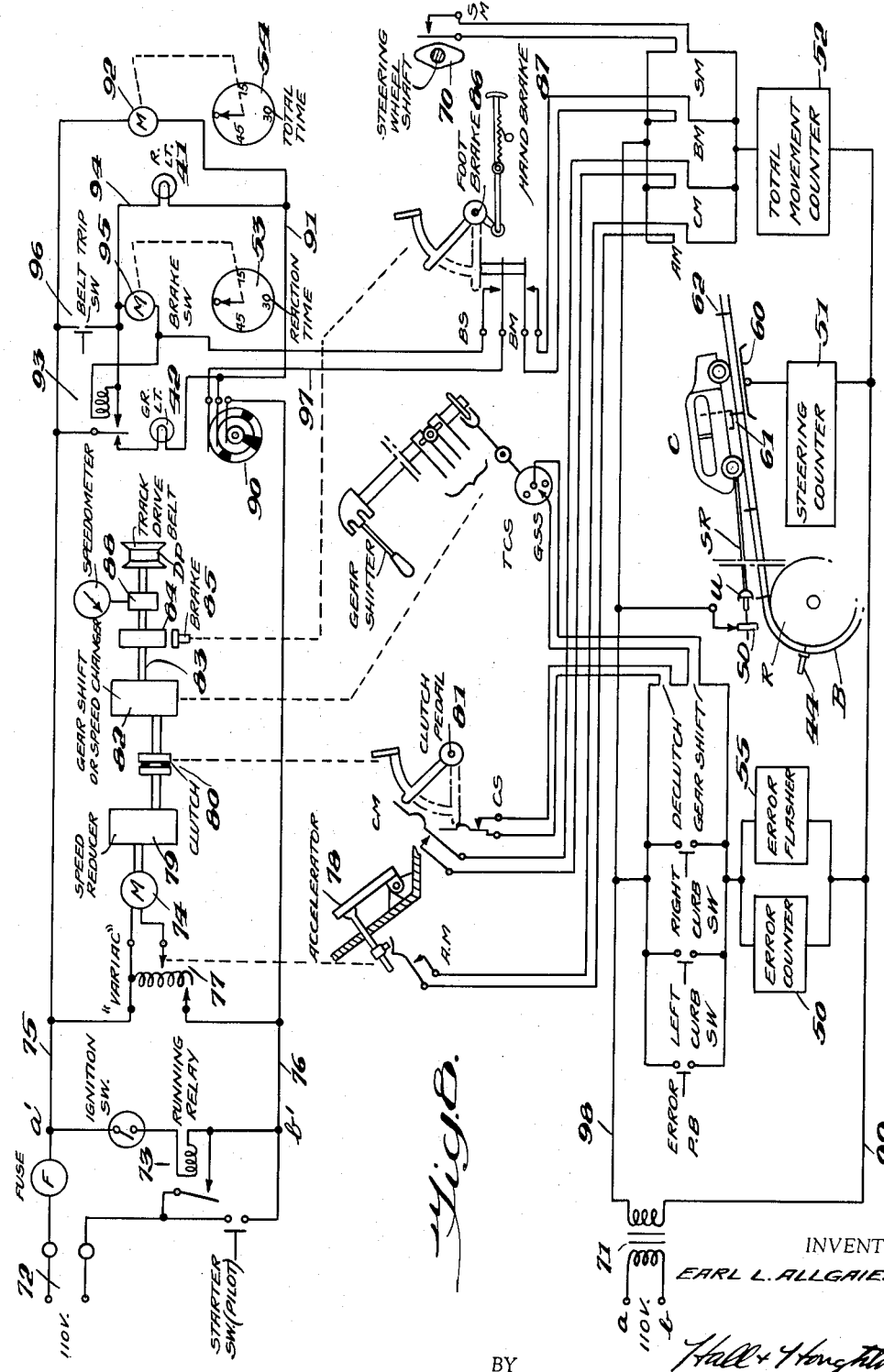

United States Patent Office 2,742,714
Patented Apr. 24, 1956

2,742,714

DRIVER TRAINING EQUIPMENT

Earl L. Allgaier, Arlington, Va.

Application February 28, 1952, Serial No. 273,975

10 Claims. (Cl. 35—11)

This invention relates to the training and testing of automobile drivers, and aims to provide an improved device for use in connection therewith.

Particular objects of the invention, severally and interdependently, reside in the provision of a mechanical device under control of the student that closely simulates the operations and problems of automobile driving; one that enables a single instructor to supervise the training of a number of students; one that eliminates the hazards of student training on the highways; and one that affords a cheap and effective aid in the teaching of automobile driving. In addition the invention aims to provide a testing device for measuring indirectly a person's ability to operate a motor vehicle; one that tests the subject objectively requiring little exercise of judgment of the examiner; one that tests the operator's judgment with respect to his ability to meet simulated driving problems while voluntarily controlling his simulated speed, and one that is simple and effective. The invention further aims to provide novel features and combinations of parts aiding in the attaining of various ones of the foregoing objects, or which may be employed to obtain greater realism and results more dependent on useful skill as part of a game of skill or entertainment device.

The invention resides in the particular features and combinations of elements hereinafter described and is more particularly pointed out in the appended claims.

In the accompanying drawings of an illustrative embodiment of the invention

Fig. 1 is a side elevation of a testing device embodying the invention.

Fig. 2 is a perspective view from the driver's seat.

Fig 3 is a more or less diagrammatic view of the interior of the driver's compartment.

Figs. 4, 5 and 6 are respectively top plan, bottom plan, and side elevation views of a preferred form of miniature car.

Fig. 7 is a detail of the steering and energizing arrangement for the miniature car.

Fig. 8 is a circuit and operating diagram of the complete device, including essential and optional elements.

Fig. 9 is a cross sectional detail of one of the curb guard switches CG of Fig. 2.

Fig. 10 is a diagrammatic detail of a tripping means for the changeable exhibitor 40.

Fig. 11 is a cross sectional detail of the steering accuracy controlled contact means of Fig. 2, indicated diagrammatically in Fig. 8.

General arrangement

As will be apparent from the following detailed description, in its preferred forms the invention comprises a driver's compartment having simulated automobile controls including driving controls and a steering control. It further comprises a roadway belt with means for supporting it in front of the driver's compartment, the belt being drivable relative to the compartment in response to manipulation of the driving controls. A miniature automobile having steerable wheels is supported in a given zone of the belt, against longitudinal movement therewith, but in a manner rendering it capable of turning ambulatory movement relative to the roadway belt as the belt moves under it. Connections are provided between the steering wheel in the driver's compartment and the steerable wheels of the miniature vehicle for orienting the latter relative to the wheel carrying frame of the vehicle so as to control the turning rate of the vehicle caused by the movement of the belt in contact with and relative to its wheels. By this arrangement an action of the miniature car under control of the steering wheel is obtained that substantially duplicates the action of a real automobile, in that the steering effect is cumulative so that with a given turning position of the steering wheel the miniature vehicle continues to turn relative to the belt and to thus travel in the direction of turn cumulatively until a compensating turn is given to the steering wheel to bring the vehicle back to the desired course.

In the preferred embodiment, the roadway belt is painted or otherwise provided with roadway stripes simulating actual driving conditions, as curves, intersections, railway crossings, stop lines, traffic islands, and the like, and to enable the accuracy of steering to be measured, means is provided for registering the accuracy with which the miniature car is maintained in the proper roadway lane during the maneuvering of the vehicle by the operator.

In the preferred embodiment, for simplicity, the miniature car is retained against longitudinal movement with the belt by a swinging retaining rod that is pivoted to the vehicle, and geared to steer the wheels thereof as the rod is rotated. In this embodiment the rod is connected by a universal joint to a rotatable support which is rotated by the steering wheel.

Suitable means are provided in the preferred embodiment for registering errors, such as collision with the curb guards at the sides of the roadway belt, failure to de-clutch during gear shifting, and other errors that may be noted by the instructor or automatically registered; for registering the steering accuracy of the student; for registering his total movements of the controls as an indication of his proficiency of operation; for registering his reaction time; and for registering the total time required by him to complete a prescribed test run, as an indication of his judgment as to appropriate speeds under prescribed circumstances.

A more complete understanding of the invention, and of various modes and instrumentalities by which this general arrangement may be effected for accomplishing the general objects of the invention, may be had from the following description of an exemplary embodiment thereof, it being understood, of course, that in its broader aspects the invention is not limited to the particular details of such exemplary embodiments.

Driver's compartment

In the form shown in the drawings, the operator's compartment D (Fig. 3) includes replicas of the various controls that are manipulated by a driver in the operation of a normal automobile. For special training in the operation of specialized vehicles such as tractor trailers, for example, specialized or additional controls may be provided. In the illustrative embodiment the controls for a standard passenger vehicle are shown comprising the starter button STA, the ignition key-locked switch IK, speedometer SP, handbrake HB, footbrake FB, clutch CL, steering wheel SW, gearshift lever GS, and foot accelerator A.

Roadway belt

Referring to Figs. 1 and 2 the device further comprises a roadway or track belt B shown as a forwardly and preferably upwardly extending continuous belt trained over suitable driving and idling rollers R (Fig. 8). The roller nearest the driving compartment D, Fig. 1, is the driven roller and is provided with a belt drive comprising a driving pulley DP and a driven pulley DP'. The forward idling roll (not shown) is carried by a shaft S, Fig. 1, associated with an adjusting means of any suitable form, shown as a pin positioned slide SL, to enable the belt to be tightened. This forward end of the roadway belt assembly is suitably supported as by adjustable legs L, Fig. 1, and the entire beltway is preferably made demountable from the driver's compartment D, when the belt drive DP—DP' and any wiring interconnection are disconnected, to facilitate shipment and storage. The roadway belt B, as mentioned above, is preferably painted or otherwise provided with roadway lanes exemplified at RW, Fig. 2, that simulate actual driving conditions, as curves, intersections, and the like.

As hereinafter described in connection with Fig. 8 the driving and braking elements are under control of the operator, and with the exception of the steering wheel SW, in the illustrative embodiment are associated with the driving of the belt B (Figs. 2 and 8) through the drive pulleys DP and DP', Fig. 1.

Steering

The steering wheel SW, Figs. 1, 2, 3, and 7, rotates a steering rod SR, Fig. 2, about its own axis by a suitable universal connection such as that shown in Fig. 7. The illustrative arrangement, Fig. 7, comprises a driving cord 10 frictionally or otherwise secured to the steering column SC, and taking at least several turns thereabout, and extending about a rotatable support or steering disc SD and a steering idler SI, shown as carried by an idler arm 11 pivoted at 12 and drawn tight as by a tension spring 13. The steering disc SD, mounted on a fixed pivot associated with the driver's compartment D, is coupled to the steering rod SR by the universal joint U, Fig. 7.

As best shown in Fig. 2 the steering rod SR extends forwardly over the belt B and is connected at its forward end to the miniature car C as diagrammatically indicated in the lower portion of Fig. 8.

The steering rod SR, is associated with the car in such fashion as to affect steering thereof by rotation of the rod, while positioning the car a predermined distance from the driver's compartment D.

Preferred form of car

In accordance with the present invention the miniature car C is of self ambulant form i. e. it is provided with steering mechanism simulating that of the vehicle with respect to which the driver is being trained or tested.

In the exemplary embodiment of Figs. 4 through 6, in which the top, shown in Figs. 1, 2 and 8, has been removed, the miniature car chassis comprises a frame or base 20, rear wheels 21 rotatable on fixed studs or axles 22 carried by plates 22a, and front wheels 23 steerably mounted on king pins 24 to the upper ends of which are fixed steering arms 25 that are respectively connected by drag links 26 to the opposite ends of steering link 27. The steering link 27 as best shown in Fig. 6 is provided with a friction surface 28 and is pressed downwardly against a steering gear 29 by a coil spring 30 surrounding a threaded sleeve 31 carrying a spring compressing nut 32. Thus, as the gear 29 is rotated, the steering link 27 is turned and the wheels are thereby moved to the limit permitted by one or the other of the stops 33, after which further rotation of the steering gear 29 merely produces slip at the friction surface 28.

The steering gear 29 is in turn driven by a steering pinion 34 fixed on a common shaft with a bevel gear 35 that meshes with a bevel gear 36 fastened to the steering rod SR as best shown in Fig. 5. In the arrangement shown, the forward end of the steering rod SR and the bevel gear 36 are carried by a U-plate 37 that rotates about the axis of the bevel gear 35 and pinion 34. In this way rotation of the steering rod SR serves to orient the front wheels of the miniature car, but the car is then free to orient itself relative to the steering rod in response to the relative travel between it and the belt S, Fig. 2.

Instruction exhibitor

As shown in Figs. 1 and 2 the device is preferably provided with an instruction exhibitor 40 comprising red and green lights 41 and 42, and a changeable exhibitor 43. The exhibitor 43 displays instructions for the next maneuver to be executed by the driver, and is altered in any suitable way, for example being tripped by a lug 44 carried by the belt B as shown in Fig. 8. As the belt B is preferably reversible in its direction of rotation, the tripping means for the drum 43 is preferably pivoted so that it is operated by the lug 44 only on "forward" movement of the belt B, i. e. movement thereof toward the operator. Such an arrangement is illustrated diagrammatically in Fig. 10, in which the drum 43 is provided with a ratchet wheel 45a, resiliently held in its several positions by a spring detent 43b, the drum shaft having rotatable thereon a trip lever 43c carrying a spring or gravity actuated pawl 43d engaging the ratchet 43a; the lever 43c being swung by the lug 44 engaging its lower end 43e, and falling back by gravity to its initial position in engagement with a stop 43f, the end 43e being hinged at 43g to swing free when the belt B is driven in the reverse direction. The commutator 90, Fig. 8, may be mounted on and rotate with the shaft of drum 43, as hereinafter described.

Registering devices

As further shown in Fig. 1 the device comprises, conveniently on the side of the driver's compartment B, an error counter 50, a steering counter 51 and a total movement counter 52 as well as a reaction timer 53 and a total timer 54. An error flasher 55 is also provided in any convenient location and may be positioned where it may be seen by the driver if desired, as indicated in Fig. 3.

Referring to the lower left portion of Fig. 8, the error counter 50 and error flasher 55 are shown connected in parallel with each other and in series with a parallel bank of error responsive contacts. As exemplifying the errors registerable with and without the volition of the instructor, there are shown an error push button for operation by the instructor when he sees the student make an error; left curb contacts and right curb contacts that are built into the respective curb guards CG (Fig. 2) and that are closed when the miniature car strikes against either of these guards; and gear shift error contacts shown as comprising a gear shift switch GSS (Fig. 8) closed each time the gear shifter lever is moved to and from neutral position, and therefore indicated as a transitory contact switch TCS, and in series therewith a clutch switch CS opened each time the clutch pedal is depressed, the latter switch opening the circuit to prevent error registrations if the proper declutching is effected concurrently with the movement of the gear shift lever. The curb contacts CG, Fig. 2 may be of any suitable form, for example, as shown in Fig. 9, they may comprise a longitudinally extending light spring strip CG' adapted to be depressed by contact of the car therewith into contact with a second metal strip CG", the strips constituting a switch or elongated set of contacts connected in the circuit of the error counter 50 as shown in Fig. 8.

In Fig. 2 and in the lower central portion of Fig. 8, there is illustrated a preferred form of steering accuracy detector comprising a metallic plate 60 under the belt B in underlying relation to the zone at which the car is held by the swinging retainer rod SR.

The car C is provided with a contact shoe 61, better shown in Figs. 5 and 6, which in the preferred embodiment comprises a wire or rod vertically slidable through the threaded sleeve 31, and having its lower end bent rearwardly to assume a trailing position during relative movement of the belt B and car C. As shown in Figs. 7 and 8, an electrical connection is made to the shoe 61 in any suitable way, as by means of a brush 62a, Fig. 7, bearing against the rotating support SD which is electrically connected to the shoe 61 by way of the universal joint U, swinging rod SR, and the metallic gearing 36, 35, 34, 29, 31 (Fig. 6).

With this arrangement, contact elements 62, shown in Figs. 2 and 8 as staples passing through the belt B, are employed. In the illustrated embodiment these staples 62 are spaced along the approximate center of the highway lane to be followed and an error in steering results in a failure of the shoe 61 to contact certain advancing staples 62 and is thus indicated by a reduction in number of operations of the steering counter 51.

The total movement counter 52 (Fig. 1 and lower right hand portion of Fig. 8) registers all movements of selected driving controls including the steering control, if desired. For this purpose circuit closing contacts are associated with each of the controls, as exemplified by the accelerator movement contacts AM, the clutch movement controls CM, brake movement controls BM and steering movement controls SM, Fig. 8. Each of the contacts AM and CM in the form shown is closed transitorily as the associated element is operated, and the contacts SM are likewise closed transitorily by cam means 70 rotating with the steering column in the form shown. As will be understood, the hand brake (Fig. 8) may operate on the driving system for the track belt drive at any suitable point, and may be either separate from or associated with the foot-brake, in any manner analogous to conventional automobile practice, for example. In the form shown, for simplicity the hand brake is shown as of the type that works through the same shoe as the foot-brake, and which, in effect applies the foot-brake and locks it in engagement. With this arrangement operation of the hand-brake as well as the foot-brake may control both the reaction timer and the total movement counter.

Representative circuitry etc.

In the illustrative embodiment of the invention, as shown in Fig. 8, certain parts of the apparatus are arranged to be energized from the ordinary house-current 110 v.–A. C. source and certain parts are arranged to be energized therefrom through a step down transformer. It will be understood that the primary of the transformer 71 may be connected with the input to the 110 v. circuits to a common appliance cord. On the other hand, the terminals *a* and *b* of the primary of the transformer 71 may be connected to the 110 v. leads as at *a'* and *b'* beyond the simulated ignition switch and starter contacts, so that the transformer will be energized only when the 110 v. total timer is energized.

In the 110 volt circuit shown, the key operated ignition switch and the starter contacts are arranged in series, and a coil 73 is provided for holding the power circuit closed across the starter contacts when the ignition switch and starter contacts are both closed, and for opening the circuit across the starter contacts when the ignition switch is opened. Thus a response simulating that of an actual automobile is afforded. Thus, with respect to the relay coil 73, if the starter switch is open, closing of the ignition switch neither energizes the coil nor any other equipment. If the ignition switch is open, closing of the starter switch will initiate operation of the equipment but will not energize relay 73, and when the starter button is released the driving of the equipment ceases. However, if the starter switch is closed while the ignition switch is closed, relay 73 is energized and closes the holding circuit by-passing the starter switch so that the operation of the equipment continues after release of the starter until the ignition switch is opened.

The driving motor 74 for the roadway belt B is energized from the 110 v. power leads 75 and 76 through a "Variac" or variable voltage controller 77, that is controlled by the foot accelerator 78 to vary the motor between idling and full driving speeds. The motor 74 drives a speed reducer 79 which in turn is connected to the driving element of a clutch 80, disengaged by depression of the clutch pedal 81. The driven element of clutch 80 drives gear shift or speed changing device 82 of any suitable form, that preferably includes forward and reverse gearing of any conventional type. The output shaft 83 of gear box 82 is the main drive shaft for the track driving belt pulley DP and may carry a flywheel 84, on which the brake shoe or shoes 85 controlled by the foot and hand brakes 86 and 87 may operate, and a speedometer connection 88.

As above mentioned, the instruction exhibitor 40 comprises red and green lights 41 and 42 and a changeable exhibitor 43, the latter being tripped through a series of steps by repeated action of the belt carried pivoted lug 44 (bottom of Fig. 8). On the same shaft as the changeable exhibitor is carried a three brush commutator 90 (upper right Fig. 8). In the form shown the first ring of this commutator maintains continuous contact with a brush connected to the power lead 76; the second ring is electrically connected to the first ring and connects the power line 76 to the timer return line 91 during the interval of test; and the third ring is also electrically connected with the first and is divided into a plurality of segments (illustrated as three), for limiting the operability of the stop warning or "stop-lights" to coincide with certain of the instructions carried by the exhibitor drum 43.

In the embodiment shown, the drum 43 exhibits a sign reading "end of test" when the circuit 91 is disconnected from the circuit 76 by the second ring of commutator 90, and the drum 43 and commutator 90 are stepped forward manually by the instructor to exhibit the sign "start" and simultaneously energize the driving motor 92, for the total time register 54, and the green light 42, which is in circuit with the back contact of a three-way holding relay 93. The forward contact of the relay 93 is connected to its holding coil, and to a bus 94 that when energized feeds the circuit of the red-light 41, and the circuit of a driving motor 95 for the reaction timer 53. The returns from the holding coil 93 and reaction timer motor 95 pass through a circuit opener or brake switch BS to stop the operation of the reaction timer and restore the green light, on actuation of the brake. A circuit closer or belt trip switch 96, that may be transitorily closed by a belt carried trip, which may be the same trip 44 (bottom of Fig. 8) that operates the changeable exhibitor, is included to energize the bus 94 from the power line 75 and thus energize the holding coil 93, as the belt trip 44 passes contacts 96, provided the third commutator ring is closing the return 97 from the brake switch BS.

When the return 97 is closed, and trip switch 96 is transitorily closed, relay 93 opens the green light circuit 42 and closes the relay armature to the forward holding contact of the relay, thus maintaining operations of the red light 41 and of the reaction timer motor 95 until the operator reacts and opens the holding circuit by depressing the foot brake (or applying the hand brake) in the form shown. As soon as the coil of relay 93 is deenergized by the brake switch BS, the armature of relay 93 returns to its back-contact re-energizing the green light, until another instruction setting and tripping of the switch 96 cooperate to again energize the bus 94.

During the test period, the changeable exhibitor 43 is stepped forward once for each complete revolution of the belt B, when one lug 44 is employed. Its several signs may carry standard test instructions, as "start engine," "start car," "proceed in high gear," "park at point A" (marked on belt), "proceed," "back from B to C," "proceed in low gear," "take detour," "wind between red dots," etc., and it or the belt B may carry standard railroad crossing warnings, boulevard stop signs, and the like, while the belt may carry road intersections, no parking signs, no passing signs, highway no-passing lines, driveway entrances, fire plugs, etc., the presence of which may either cooperate with or countermand the instructions of the exhibitor 43. The exhibited instructions may be made as detailed as desired for the beginner and more general and varied for the more advanced student. The actuation of the stop warning or red light may also coincide with, or countermand exhibited instructions. Thus extremely comprehensive instruction, and extremely versatile and comprehensive testing of the operator may be achieved.

The low voltage control circuit is employed for those controls apt to be handled by students or others. As shown at the lower part of Fig. 8 these usually comprise the curb switches, and associated error counters 50, the steering counter 51 with its exposed circuit elements SR, C, 60, 62, and the total movement counter with its several switches. As above noted in the exemplary embodiments the parallel error counter and flasher circuit 50—55 in series with its parallel bank of control contacts, is connected across the low voltage leads 98 and 99, the steering counter 51 and its control contacts are similarly connected, and the total movement counter 52 and its parallel bank of control contacts is likewise connected across these leads.

Variants

From the foregoing description it will be apparent to those skilled in the art that various modifications and adaptations may be made without departure from the broader aspects of the invention, and that for certain purposes combinations of less than all the illustrated elements may be employed. Thus, for teaching the driving of cars with automatic gear-shifts and no clutch, the clutching elements may be omitted and an automatic gear shift controlled as to neutral, drive, low, and reverse settings may be substituted for the standard H-type gear shift shown. Similarly, various means may be employed for powering the belt drive and the speeds thereof may be controlled in any manner appropriate to the driving means employed. Likewise a shifting brush variable speed motor may take the place of the motor and variac shown, as may a motor with variable series resistance or any other equivalent device.

Mention has been made above of the fly wheel 84. This is a highly desirable feature and is preferably adjusted in weight to afford sufficient inertia to simulate, depending on the speed at which the belt B is being driven, the inertia or time lag experienced in the driving of a normal automobile between the applying of the brakes, and the stopping of the car, for example. As is well known, such time or distance lag varies with road conditions, and if desired, the gear ratio or flywheel inertia may be varied, or other provision made for simulating normal lag, or with other adjustments, the extreme lags incident to operation on wet or icy pavements.

While oral instructions given by the instructor or from a suitably tripped recorded sequence of instructions, may be employed in lieu of the printed instructions of the changeable exhibitor 43, the exhibition of printed instructions is preferred, as most actual traffic directing signs are printed, and the changeable exhibitor thus aids in training the student to watch for road signs without loss of attention to the steering and other manipulations necessary to drive the car.

The inclusion of a simulated speedometer SP (Fig. 3), adjusted to exhibit scale miles indicative of the relative speed of the belt B and car C, may be dispensed with, but is particularly desirable. It not only enables the driver to conform to speed instructions but also when the student knows that his total time is being checked his reaction is similar to that of a driver in a hurry to reach a destination, and the care with which he nevertheless controls his speed for steering accuracy and in response to instructions carried by the exhibitor or belt, may be considered as indicative of the care he will probably exercise in actual driving, thus showing whether he needs special cautioning against excessive speeds.

While slat or other forms of belt or movable roadway may be employed, a canvas belt roadway is preferred as this takes paint readily and is strong and flexible.

The illustrated removability of the body of the miniature automobile is also a desirable feature as an aid in explaining to the student the mechanics of steering, but if desired, the body may be fixed on the operating car, and a separate chassis may be used for such instruction.

These and many other modifications in details, the addition of further testing elements, the substitution of different car retaining elements, and the like, may of course be effected without loss of the benefits of the invention as herein disclosed.

It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. In a device of the class described, in combination, a driver's compartment having simulated automobile controls including driving controls and a steering wheel, a roadway belt with means for supporting it in front of said compartment, said belt being drivable in response to manipulation of said driving controls, and a miniature automobile having a frame and steerable wheels orientable relative to its frame, said miniature automobile running on said belt, a horizontally swingable control member extending forwardly from said driver's compartment over said roadway belt, said miniature automobile being swingably connected to the end of said control member remote from said driver's compartment, means associated with said swingable control member and acting through the same for turning the steerable wheels of the miniature automobile in response to manipulation of said steering wheel, said steerable automobile being retained by said swingable control member in a predetermined zone against longitudinal movement with said belt, but being capable of turning ambulatory movement relative to said belt in response to driving of said belt and the orientation of said steering wheel.

2. A device of the class described comprising, in combination, a driver's compartment having simulated automobile controls including driving controls and a steering control, a roadway belt with means for supporting it in front of said compartment, said belt being drivable in response to manipulation of said driving controls, and a miniature automobile having a frame and steerable wheels orientable relative to its frame, said miniature automobile running on said belt, means for retaining the steerable automobile in a predetermined zone against longitudinal movement with said belt, means for moving the steerable wheels of said miniature automobile in response to manipulation of said steering control, a contact shoe carried by said miniature automobile and contacting the upper face of said belt, a metallic member under said belt in underlying relation to said zone, and contact elements extending from face to face of said belt and spaced along the center of the course to be followed by the miniature automobile for establishing electrical connection between said shoe and said metallic member each time the automobile is on course as one of said spaced contact elements passes under it, so that the number of such on-course connections, compared to the possible total number thereof, affords a positive measure of the distance travelled on course as a measure of steering accuracy.

3. A combination according to claim 2, further comprising steering accuracy counting means actuated by the establishment of said electrical connections through said contact elements.

4. In a device of the class described, in combination, a driver's compartment having simulated automobile controls including driving controls and a steering wheel, a roadway belt with means for supporting it in front of said compartment, said belt being drivable in response to manipulation of said driving controls, and a miniature automobile tracking said belt and having a frame and steerable wheels orientable relative to its frame in accordance with the manipulation of said steering wheel, said steerable automobile being retained in a predetermined zone against longitudianl movement of said belt by a swingable rod pivoted to swing in a horizontal plane relative to said automobile, but being capable of turning ambulatory movement relative to said belt in response to driving of said belt and the orientation of said steering wheel, said pivoted rod being rotatable about its own axis and being connected to turn the steerable wheels of said automobile as it is rotated, said rod being rotated in response to movement of said steering wheel.

5. A combination according to claim 4, the connection betwen said rod and said steerable wheels including a friction clutch to permit ambulatory turning of the automobile relative to said rod after said wheels are moved to their maximum steering angles.

6. A combination according to claim 4, said rotatable rod being connected to a rotatable support by a universal joint, and said support being rotated by movement of said steering wheel.

7. In a device of the class described, in combination, a driver's compartment having simulated automobile controls including driving controls and a steering wheel, a roadway belt with means for supporting it in front of said compartment, said belt being drivable in response to manipulation of said driving controls, and a miniature automobile tracking said belt and having a frame and steerable wheels orientable relative to its frame in accordance with the manipulation of said steering wheel, said steerable automobile being retained in a predetermined zone against longitudinal movement with said belt, but being capable of turning ambulatory movement relative to said belt in response to driving of said belt and the orientation of said steering wheel, a trip means carried by said belt, "stop" warning and reaction timer means put into operation by said trip means, and a "go" light, said driving controls including a brake, and means for terminating the operation of said stop warning and reaction timer means and for energizing the "go" light on application of said brake.

8. A device of the class described comprising, in combination, a driver's compartment having simulated automobile controls including driving controls and a steering control, a roadway belt with means for supporting it in front of said compartment, said belt being drivable in response to manipulation of said driving controls, and a miniature automobile having a frame and steerable wheels orientable relative to its frame, said miniature automobile running on said belt, means for retaining the steerable automobile in a predetermined zone against longitudinal movement with said belt, means for moving the steerable wheels of said miniature automobile in response to manipulation of said steering control, a total number of movements counter, and means responsive to each movement of said steering and driving controls, respectively, for actuating said counter during a test, the total number of movements registered by said counter during each test, affording a measure of the skill of the driver being tested.

9. In a device of the class described, in combination, a driver's compartment having simulated automobile controls including driving controls and a steering wheel, a roadway belt with means for supporting it in front of said compartment, said belt being drivable in response to manipulation of said driving controls, and a miniature automobile tracking said belt and having a frame and steerable wheels orientable relative to its frame in accordance with the manipulation of said steering wheel, said steerable automobile being retained in a predetermined zone against longitudinal movement with said belt, but capable of turning ambulatory movement relative to said belt in response to driving of said belt and the orientation of said steering wheel, said belt being drivable by an electric motor under control of said driving controls, said driving compartment being equipped with an ignition switch and starter contacts, power leads for said motor including said ignition switch and said starting contacts in series, a coil for holding the circuit closed across said starter contacts, said coil being energized on closing of said ignition switch and starter contacts and being deenergized on opening of said ignition switch.

10. In a device of the class described, in combination, a driver's compartment having simulated automobile controls including driving controls and a steering wheel, a roadway belt with means for supporting it in front of said compartment, said belt being drivable in response to manipulation of said driving controls, and a miniature automobile tracking said belt and having a frame and steerable wheels orientable relative to its frame in accordance with the manipulation of said steering wheel, said steerable automobile being retained in a predetermined zone against longitudinal movement with said belt, but being capable of turning ambulatory movement relative to said belt in response to driving of said belt and the orientation of said steering wheel, said driving controls including a forward and reverse gear shift means, and the miniature car supporting run of said belt being drivable toward and away from said compartment in response to movement of said gear shift means to its forward or reverse position, said miniature car being retained in said zone against longitudinal movement of the belt in either of said directions.

References Cited in the file of this patent

UNITED STATES PATENTS

| Number | Name | Date |
|---|---|---|
| 2,254,967 | Larkins | Sept. 2, 1941 |
| 2,260,432 | Brown | Oct. 28, 1941 |
| 2,273,091 | De Silva | Feb. 17, 1942 |

FOREIGN PATENTS

| Number | Country | Date |
|---|---|---|
| 41,116 | Holland | June 16, 1937 |
| 250,610 | Great Britain | Oct. 7, 1926 |
| 322,268 | Great Britain | 1928 |
| 446,214 | Great Britain | Apr. 27, 1936 |
| 452,735 | Great Britain | Aug. 28, 1936 |
| 489,257 | Germany | Jan. 16, 1930 |
| 165,789 | Austria | Apr. 25, 1950 |